United States Patent
Shelton et al.

(10) Patent No.: US 7,725,462 B2
(45) Date of Patent: May 25, 2010

(54) APPLYING SEGMENT CONDITIONS TO MEASURE RESULTS

(75) Inventors: Scott Shelton, Apex, NC (US); Henry Fu, Chapel Hill, NC (US); Michael Chaves, Cary, NC (US); Leslie Mannion, Wake Forest, NC (US); Robert Baril, Apex, NC (US)

(73) Assignee: Teradata US, Inc., Miamisburg, OH (US)

( * ) Notice: Subject to any disclaimer, the term of this patent is extended or adjusted under 35 U.S.C. 154(b) by 365 days.

(21) Appl. No.: 11/646,630

(22) Filed: Dec. 28, 2006

(65) Prior Publication Data

US 2008/0162401 A1 Jul. 3, 2008

(51) Int. Cl.
  G06F 17/30 (2006.01)
(52) U.S. Cl. ................................. 707/722; 707/944
(58) Field of Classification Search ................. 707/3
  See application file for complete search history.

(56) References Cited

U.S. PATENT DOCUMENTS

| 6,317,750 | B1 * | 11/2001 | Tortolani et al. ....... 707/103 R |
| 6,879,977 | B2 | 4/2005 | Huffman et al. |
| 6,922,600 | B1 * | 7/2005 | Conrad et al. ............ 700/108 |
| 7,136,873 | B2 | 11/2006 | Smith et al. |
| 7,139,762 | B2 | 11/2006 | Labarge et al. |
| 2001/0037329 | A1 | 11/2001 | Huffman et al. |
| 2004/0015470 | A1 | 1/2004 | Smith et al. |
| 2004/0205078 | A1 | 10/2004 | Galindo-Legaria et al. |
| 2005/0004906 | A1 | 1/2005 | Huffman et al. |
| 2005/0038631 | A1 * | 2/2005 | Steinke ................ 702/182 |
| 2005/0091206 | A1 * | 4/2005 | Koukerdjinian et al. ...... 707/3 |
| 2005/0097100 | A1 | 5/2005 | Galindo-Legaria et al. |
| 2006/0015367 | A1 * | 1/2006 | Taylor et al. ............ 705/2 |
| 2006/0122990 | A1 | 6/2006 | Smith et al. |
| 2007/0061344 | A1 * | 3/2007 | Dickerman et al. ....... 707/100 |

OTHER PUBLICATIONS

Microsoft Access 2003.*

* cited by examiner

Primary Examiner—James Trujillo
Assistant Examiner—William Spieler
(74) Attorney, Agent, or Firm—Schwegman, Lundberg, Woessner PA

(57) ABSTRACT

Techniques for applying segment conditions to measure results are presented. Row and column segment data is acquired from a database according to row and column definitions. A measure calculation is applied against the intersecting row and column segment data. Next, one or more combinations or conditions derived from the row and column definitions are used as a filter to produce filtered results.

7 Claims, 4 Drawing Sheets

CUSTOMER TRANSACTIONAL DATA

| CUSTOMER | PURCHASE | AMOUNT |
|---|---|---|
| HENRY | SHOES IN STORE | $5 |
| HENRY | SHIRT IN STORE | $2 |
| HENRY | CD ONLINE | $7 |
| ROB | SHOES IN CATALOG | $4 |
| ROB | DVD IN CATALOG | $20 |
| ROB | WATCH ONLINE | $10 |
| SCOTT | DVD ONLINE | $15 |
| SCOTT | SHIRT IN CATALOG | $8 |
| SCOTT | BOOK IN A STORE | $3 |

RESULTS LEGEND

1 DO NOT FILTER MEASURE RESULTS BY SEGMENT CRITERIA

2 FILTER BY ROW & COLUMN SEGMENT CRITERIA (LINKED)

3 FILTER BY ROW & COLUMN SEGMENT CRITERIA (UNLINKED)

4 FILTER BY ROW SEGMENT CRITERIA ONLY

5 FILTER BY COLUMN SEGMENT CRITERIA ONLY

MEASURE = SUM(PURCHASEAMOUNT)

CROSS SEGMENT AND ANALYSIS RESULTS
(SHOWING ALL COMBINATIONS BASED ON DATA AND LEGEND ABOVE)

| PEOPLE IN RALEIGH | SHOPPED IN STORE | SHOPPED ONLINE | SHOPPED IN CATALOG |
|---|---|---|---|
| | HENRY | HENRY, ROB | ROB |
| BOUGHT SHOES | 1-$14<br>2-$5<br>3-$7<br>4-$5<br>5-$7 | 1-$48<br>2-$0<br>3-$26<br>4-$9<br>5-$17 | 1-$34<br>2-$4<br>3-$24<br>4-$4<br>5-$24 |
| | HENRY, SCOTT | HENRY, SCOTT | SCOTT |
| BOUGHT SHIRTS | 1-$40<br>2-$2<br>3-$18<br>4-$10<br>5-$10 | 1-$40<br>2-$0<br>3-$32<br>4-$10<br>5-$22 | 1-$26<br>2-$8<br>3-$8<br>4-$8<br>5-$8 |
| | HENRY | HENRY | NOBODY |
| BOUGHT CDS | 1-$14<br>2-$0<br>3-$14<br>4-$7<br>5-$7 | 1-$14<br>2-$7<br>3-$7<br>4-$7<br>5-$7 | 1-$0<br>2-$0<br>3-$0<br>4-$0<br>5-$0 |
| | SCOTT | ROB, SCOTT | ROB, SCOTT |
| BOUGHT DVDS | 1-$26<br>2-$0<br>3-$18<br>4-$15<br>5-$3 | 1-$60<br>2-$15<br>3-$45<br>4-$35<br>5-$25 | 1-$60<br>2-$20<br>3-$47<br>4-$35<br>5-$32 |
| | NOBODY | ROB | ROB |
| BOUGHT WATCHES | 1-$0<br>2-$0<br>3-$0<br>4-$0<br>5-$0 | 1-$34<br>2-$10<br>3-$10<br>4-$10<br>5-$10 | 1-$34<br>2-$0<br>3-$34<br>4-$10<br>5-$24 |
| | SCOTT | SCOTT | SCOTT |
| BOUGHT BOOKS | 1-$26<br>2-$3<br>3-$3<br>4-$3<br>5-$3 | 1-$26<br>2-$0<br>3-$18<br>4-$3<br>5-$15 | 1-$26<br>2-$0<br>3-$11<br>4-$3<br>5-$8 |

LISTED AT THE TOP OF EACH INTERSECTED CELL ARE THE PEOPLE WHO ARE INCLUDED IN THAT CELL. IF TARGETING WAS DONE ON THOSE CELLS, THE PEOPLE LISTED WOULD BE INCLUDED IN THE RESULTING SEGMENT.

IN ORDER TO QUALIFY TO BE INCLUDED IN A CELL, YOU MUST MEET BOTH THE ROW SEGMENT CONDITION AND THE COLUMN SEGMENT CONDITION (ALTHOUGH NOT NECESSARILY AT THE SAME TIME).

*FIG. 4*

APPLYING SEGMENT CONDITIONS TO MEASURE RESULTS

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots and images as described below and in any drawings hereto: Copyright© 2006, NCR Corp. of Dayton, Ohio—All Rights Reserved.

FIELD

The invention relates generally to database technology and more particularly to techniques for applying segment conditions to measure results.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals: such as planning, analytics, reporting, etc.

Often an analyst associated with an enterprise has a business problem to solve or business question to answer that entails analyzing information from the enterprise's database. Acquisition of selective information is probably a first and cursory step in the overall analytical process that the analyst needs to follow in order to solve the business problem or answer the business question. The selective information may itself be queried and mined for certain predefined characteristics or attributes. Once these results are obtained, the analyst may want to further perform some calculation against the data that conforms to the predefined characteristics. Yet, modern database interfaces do not permit such fine-grain calculations to be achieved in an automated manner for the analyst. Consequently, an analyst may have to enlist the services of a programmer or may have to manually calculate items of interest before a desired business question can be properly answered.

Thus, it can be seen that improved mechanisms for applying calculations within a database environment are desirable.

SUMMARY

In various embodiments, techniques for applying segment conditions to measure results are presented. According to an embodiment, a method for applying a measure against database segment data is presented. A first criterion and a second criterion are acquired from row data and column segment data. A measure calculation is applied against the row and column segment data. Next, the row and column segment data are filtered using one or more combinations of the first criterion and the second criterion to produce filtered results. Finally, a results grid is generated to graphically depict the filtered results.

BRIEF DESCRIPTION OF THE DRAWINGS

FIG. 4 is an example screen shot depicting results associated with various measure calculations applied against sample database segments, according to an example embodiment.

DETAILED DESCRIPTION

Figure 1:
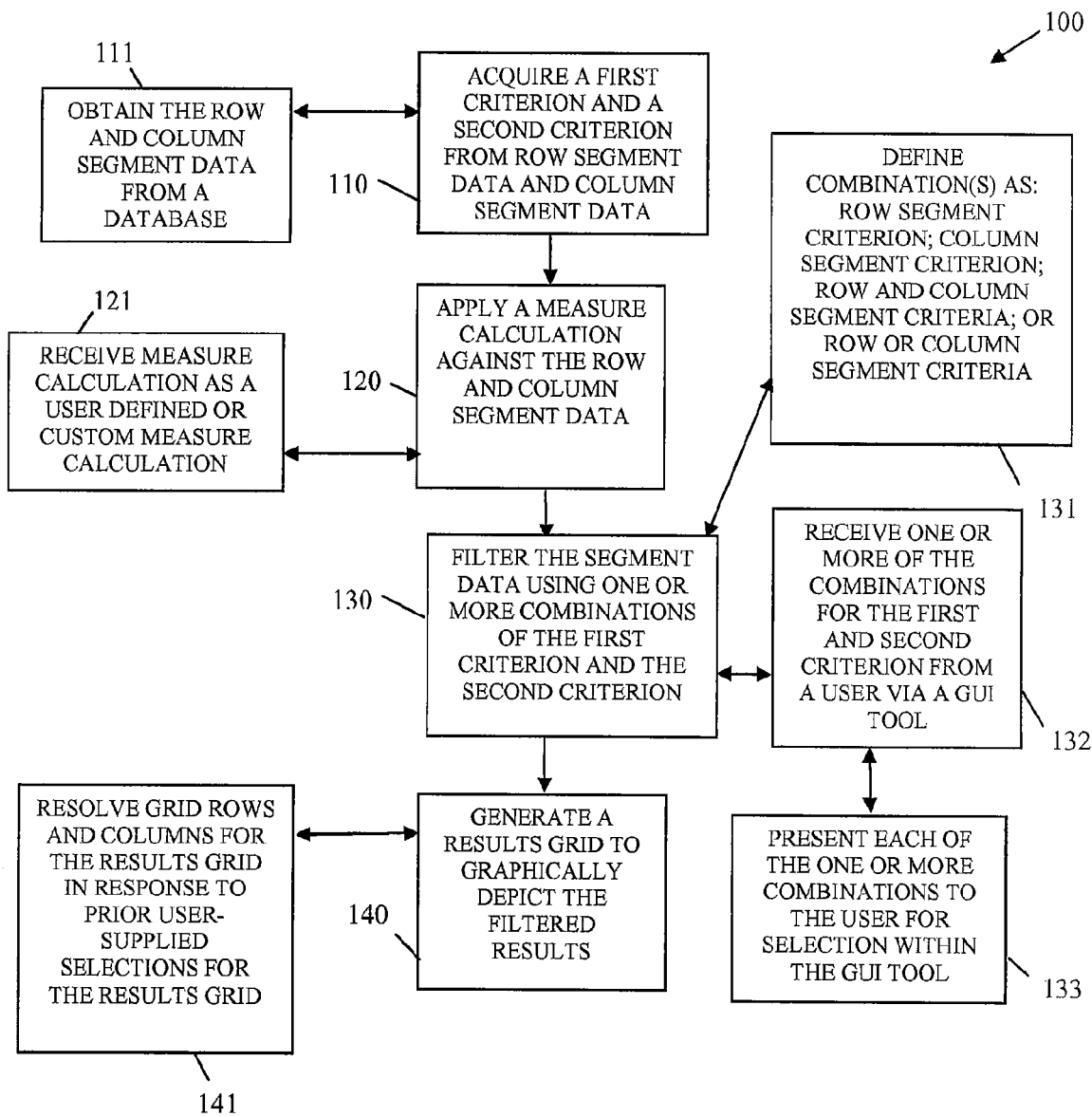
FIG. 1 is a diagram of a method for applying a measure against database segment data, according to an example embodiment.

FIG. 1 is a diagram of a method 100 for applying a measure against database segment data, according to an example embodiment. The method 100 (hereinafter "database segment measure calculation service") is implemented in a machine-accessible or computer-readable medium as instructions that when executed by a machine (processing device) performs the processing depicted in FIG. 1. Moreover, the database segment measure calculation service is optionally accessible over a network. The network may be wired, wireless, or a combination of wired and wireless.

A "database" as used herein is a relational database, or a collection of databases organized as a data warehouse. According to an embodiment, the database is a Teradata® product or service distributed by NCR Corporation of Dayton, Ohio.

The database includes a variety of enterprise information organized in tables. One type of information is referred to as an "entity." An entity is something that can be uniquely identified (e.g., a customer account, a customer name, a household name, a logical grouping of certain types of customers, etc.).

A segment is a user-defined set of information obtained from one or more tables of the database. For example, a segment may include all customers living in North Carolina. Some segments may be predefined and selectable by a user. Other segments may be custom defined by a user or analyst to satisfy a particular problem. Conditions or Criteria define how to obtain the segment, such as "customers=all" and "state=NC" in the previous example.

Stated another way, a "segment" is a collection of entities in a data warehouse (customers, products, stores, transactions, etc.) having some criteria in common. For example, a "segment" might be "customers in New York who bought shoes during Christmas" or "all blue products, which cost over $100.00." Each segment may have one or more criteria, which is user defined.

The intersection of two or more segments may be calculated by plotting rows and columns of segments in a grid. Measures are calculations, which may be computed at the intersection of the row segments and column segments. For instance, measures may be used to calculate the number of customers in the intersection of two segments, or the total purchase amount of the customers in that intersection.

Previous technical approaches to applying measures took into account the set of entities represented by the intersection of two segments; but the measure results did not take into account the criteria that was used to generate the two segments in the first instance. In other words in the previous techniques, the measure calculations took into account the set of customers in the segment intersection, but the measure calculations did not take into account how that set of customers was generated when analyzing the transactions involving those customers. Techniques presented herein and below do take into account the criteria used to generate the segments.

For example, in previous techniques, if one plotted the intersection of the segments "customers who bought shoes" and "customers who shopped in my store," the measure applied as "customer count" would accurately identify the number of customers who "bought shoes" (from anywhere) and shopped in "my store" (for anything). However, the measure "total purchase amount" would calculate the total amount spent on "any" products in "any" store of the people who "bought shoes" and "shopped in my store." Thus, previous techniques would "not" calculate the total purchase amount spent on shoes in "my store," which is often the desired result and the result expected by a user.

A "filter" acquires a selective subset of data from a given set of data. In a sense, a segment definition is a filter that acquires from the database a subset of data making up the segment (segment data) by applying the criteria or conditions (segment definition) against the database (set of data) as a query.

A "measure" may be further defined as a calculation or set of calculations performed against data returned from the database during any particular operation. "Measures," as used herein, may be pre-existing within an Application Programming Interface (API) of the database or may be user-defined. An example measure may be to take the average purchase amount from a given set of data associated with customers. Measures can be simple or complex and involve multiple operations some of which rely on prior processed operations. One or more measures are applied against segment data and then further filtered, as described more completely herein and below.

It is within this context that the processing associated with the custom analysis interface service is now described in detail with reference to the FIG. 1.

At 110, the database segment measure calculation service acquires a first criterion and a second criterion from row segment data and column segment data. Initially, at 111, the database segment measure calculation service may obtain the row and column segment data from a database via a search query using a row segment definition and a column segment definition.

There are at least two defined segments. One may be viewed as a row and the other viewed as a column. Any particular designation is relative, meaning if one is designated as a row then the other remaining may be viewed as a column. The user may provide the designations for the row segment and the column segment as well. The analysis and techniques presented herein permit cross segment analysis by comparing at least two database segments against one another and then custom applying a measure calculation at the intersection of the row and column and further filtering by applying the measure calculation in a customized manner that accounts for row and/or column segment conditions defined by the user.

It is to be understood that although a single database row segment is discussed with a single database column segment, the teachings presented herein are not so limited. Thus, multiple row segments may be compared against multiple column segments and custom measure calculations applied at their intersections.

At 120, the database segment measure calculation service applies a measure calculation against the row and column segment data. At 121, the database segment measure calculation service may receive the measure calculation as a user-defined or custom measure calculation. For example, a measure calculation may total purchase amounts made by customers occurring at the intersection of the row segment data and the column segment data. Again, measure calculations may be simple additions or may be more complex entailing a series of calculations or operations. The measure calculations are applied against the intersecting cells between the rows and the columns.

The database segment measure calculation service produces results, which represent the processing at 120. That is, after the measure calculation is applied, the database segment measure calculation service has in its possession results that are further manipulated as discussed more completely below. So, the row and column segment data are further filtered to account for row segment and column segment criteria in a manner that the user can define. In fact, technically there may not be interim results "per se;" rather the database segment measure calculation service applies a measure that accounts for user-defined combinations of row and/or column segment criteria. User defined row and/or segment criteria is based on business questions that the user is attempting to answer for a given problem.

At 130, the database segment measure calculation service filters the row and column segment data using one or more combinations of the first criterion and the second criterion. The criterion can be any type of condition associated with the row or column segment definitions. For example, a row criterion may be "customers that bought shirts in the month of December" and a column criterion may be "customers that shopped in stores during the month of December."

At 131, the database segment measure calculation service may define the combinations of the row segment criterion and the column segment criterion as: just the row segment criterion; just the column segment criterion; the row segment and column segment criteria; or the row segment criterion or column segment criterion. So, in the previous example the combinations may be just "customers that bought shirts in the month of December;" just "customers that shopped in stores during the month of December;" both "customers that bought shirts and shopped in stores during the month of December;" or "customers that either bought shirts or shopped in stores during the month of December." Moreover, the user may be presented with an option to retain what was done in the past; that is, using no row or column segment criteria at all; this will return what was available in the past. However, with the teachings presented herein, the user has the option to affirmatively select such a situation; whereas in the past the user had no such option and always had results that represented no row or column segment criteria filtering.

According to an embodiment, at 132, the database segment measure calculation service may receive the one or more combinations for the first and second criterion from a user that is interacting with a Graphical User Interface (GUI) tool on the front end. The back end of the GUI tool communicates with the database segment measure calculation service. So, the user picks the particular combination that is desired or needed via the GUI tool and that is communicated to the database segment measure calculation service.

It may also be the case, at 133 that the database segment measure calculation service presents each of the one or more available combinations to the user for selection within the GUI tool. So, the user may be able to view all available combinations for the row and column criterion and select the one desired. This selection is then communicated through the GUI and received, at 132, by the database segment measure calculation service, and then row and column segment data are filtered using the selected combination of criterion or criteria.

It is noted that depending upon the selected user-measure calculation that some combinations of criteria may not be appropriate. The database segment measure calculation service may recognize these situations, at 133, and just present combinations of criteria that are permissible or logical for the given measure calculation that is to be applied.

At 140, the database segment measure calculation service generates a results grid to graphically depict the filtered results. An example grid is presented below with the discussion of the FIG. 4.

In an embodiment, at 141, the database segment measure calculation service may resolve the grid rows and columns for the results grid in response to prior user-supplied selections for the results grid. So, the GUI tool may permit the user to define the layout of the rows and columns for the results grid that presents the filtered results.

It is noted that previously, measure calculations were applied against entire row and column segments and were not further capable of being filtered. Thus, the techniques presented herein provide a more fine-grain application of custom measure calculations against selective conditions or criteria associated with cross segments of a database.

An example, results gird depicting various filtered measure calculations based on selected combinations of criteria is presented below with the discussion of the FIG. 4.

Figure 2:
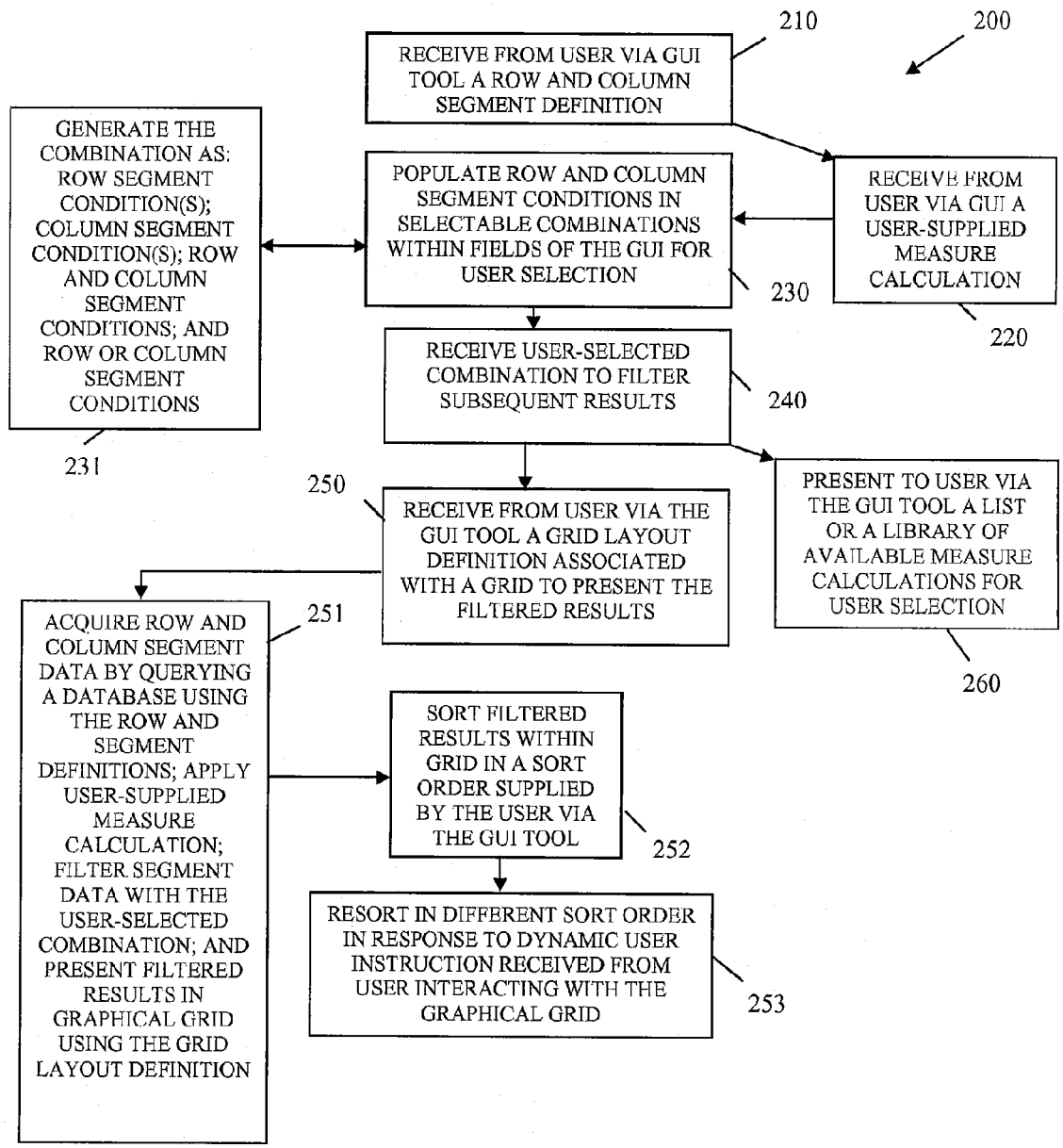
FIG. 2 is a diagram of a method for configuring and using a measure against database segment data, according to an example embodiment.

FIG. 2 is a diagram of a method 200 for configuring and using a measure against database segment data, according to an example embodiment. The method 200 (hereinafter "configuration service") is implemented in a machine-accessible and readable medium as instructions that when executed by a machine performs the processing reflected in FIG. 2. The configuration service may also be accessible over a network. The network may be wired, wireless, or a combination of wired and wireless. The configuration service presents techniques for initially configuring and subsequently using the database segment measure calculation service represented by the method 100 of the FIG. 1.

At 210, the configuration service receives from a user, via a GUI tool, row and column segment definitions. These definitions include a variety of criteria for obtaining row segment data and column segment data. These are two segments that are to be compared in some manner by the user, and the user supplies the definitions or alternatively selects the definitions from a list of available segment definitions. At this point, the actual data for the segments that are to be compared (row and column segments) do not have to have been acquired or retrieved from the database; although in some cases they may be, such as when the segments are permanently housed in their own database tables, etc.

At 220, the configuration service receives from the user, via the GUI tool, a user-supplied measure calculation. This is the measure calculation that the user wants to be applied against at the intersections of the row and column segment data, once it is acquired and is processed. The subsequent result of applying the user-supplied measure calculation is further filtered as discussed below. Again, the measure calculation takes into account the desired filtering identified by the user (discussed below) to produce the desired results.

At 230, the configuration service populates row and segment conditions in selectable combinations within fields of the GUI tool for subsequent user selection. Here, compatible conditions included within or derivable from the row and column segment definitions are identified by the configuration service and the conditions are packaged in combinations.

It is noted that not all conditions are compatible in each case. This is so, because the conditions act as filters against the user-supplied measure calculation. So, just compatible or logical conditions that make sense with respect to the user-supplied measure calculation are chosen.

Some combinations may include a single condition and other combinations include a variety of or sets of conditions. In this sense, the term "combination" may be used synonymously herein with the term "permutation," since various permutations of the conditions are assembled by the configuration service and populated as selectable condition combinations within fields of the GUI tool for the user to subsequently select.

According to an embodiment, at 231, the combinations presented via the GUI tool may be represented as: one or more row segment conditions; one or more column segment conditions; row and column segment conditions (the "and" condition is often referred to as "linked" in database parlance); and row or column segment conditions (the "or" condition is often referred to as "unlinked" in database parlance). The combinations of conditions are to be used as filters against the row and column segment intersection data by applying the user-supplied measure at the intersections of the row and column segment data.

At 240, the configuration service receives a particular user-selected combination from the user via the GUI tool. So, the user once presented with the various permissible combinations of conditions selects one, and this is communicated from the GUI tool back to the configuration service.

According to an embodiment, at 250, the configuration service may also receive from the user, via the GUI tool, a grid layout definition associated with a graphical grid to present filtered results when the row and column segment intersection data are filtered using the user-selected combination of conditions. So, the manner in which the filtered results are displayed can be configured by the user, by supplying a grid layout definition via the GUI tool to the configuration service.

In some cases, at 252, once all the above configuration information is known to the configuration service (row and column segment definitions, user-supplied measure calculation, user-selected filter combination conditions, and grid layout definition), the configuration service may, at the direction of the user, process a request to generate filtered results. To satisfy this request, the configuration service acquires row and column segment data by querying the database using the requirements of the row and column segment definitions. Next, the configuration service applies the user-supplied measure calculation. The row and column segment data are then filtered with the user-selected combination of conditions to produce filtered results. Finally, the filtered results are presented in a graphical grid to the user, where the presentation conforms to the grid layout definition (optionally also supplied by the user via the GUI tool).

In some embodiments, at 252, the configuration service may also sort the filtered results in the grid in a particular sort order. The sort order may have also been supplied and identified by the user via the GUI tool.

At 253, it may also be the case that the graphical grid is interactive or capable of being manipulated by the user. Thus, the user may dynamically direct the configuration service to resort the filtered results in the grid according to a different user-desired sort order. The user supplies dynamic instruction as the user interacts with the graphical grid for the configuration service to produce a new and different sort order for the filtered results depicted in the grid.

It is now understood how a user can interactively communicate how the user desires cross segment data to be analyzed.

This is done by: the user identifying row and column segment definitions; supplying a measure calculation to apply at intersections of row and column segment data; and identifying (via selection) a particular combination of desired conditions to apply at the intersections as a filter. The technique to process this information into a results grid may then occur in manners similar to what was discussed above with reference to the method 100 of the FIG. 1 and also with reference to some aspects of the method 200 of the FIG. 2.

Figure 3:
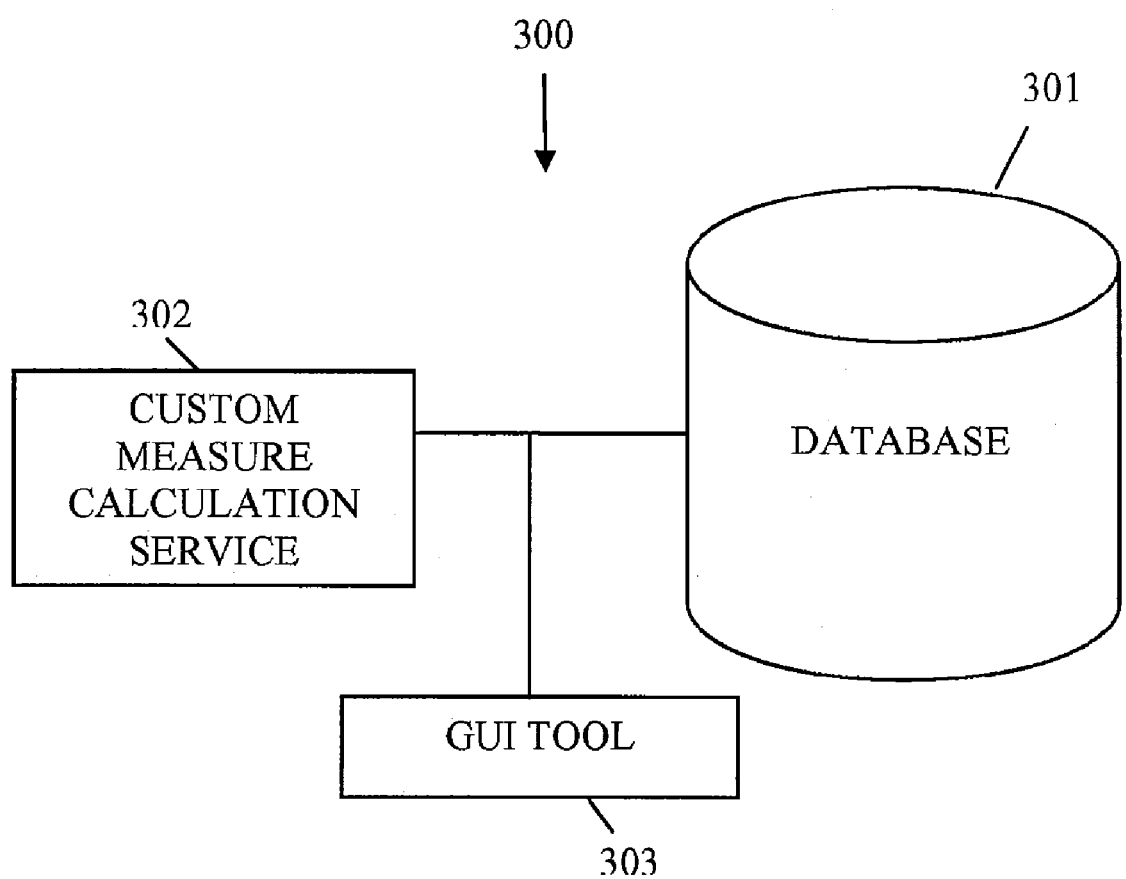
FIG. 3 is a diagram of a database segment measure calculation system, according to an example embodiment.

FIG. 3 is a diagram of a database segment measure calculation system 300, according to an example embodiment. The database segment measure calculation system 300 is implemented in a machine-accessible and readable medium and is operational over a network. The network may be wired, wireless, or a combination of wired and wireless. In an embodiment, portions of the custom analysis system 300 implements, among other things the database segment measure calculation service and the configuration service represented by the methods 100 and 200 of the FIGS. 1 and 2, respectively.

The database segment measure calculation system 300 includes a data store 301 and a custom measure calculation service 302. In some cases, the database segment measure calculation system 300 may also include a Graphical User Interface (GUI) tool 303. Each of these and their interactions with one another will now be discussed in turn.

The database 301 may be a relational database or a collection of relational databases organized and cooperating as a data warehouse. The database 301 resides within and is accessible from a machine-readable medium. According to an embodiment, the database 301 is a Teradata® product distributed by NCR, Corporation of Dayton, Ohio.

The database 301 houses a variety of tables for enterprise data. Each table may have its own schema definition that defines the fields and other aspects of the table and the data that the table may house. An Application Programming Interface (API) may be used to access and perform operations on the database 301. One aspect of the API includes a database query language, such as SQL. The database 301 interacts with the custom measure calculation service 302 and, optionally, a GUI tool 303.

The custom measure calculation service 302 is also implemented in a machine-accessible medium and is processed on a machine. The custom measure calculation service 302 is to access the database 301 to acquire user-defined row segment data and column segment data, which are to be compared or analyzed in some manner by the user in a cross-segment analysis task.

The custom measure calculation service 302 is to apply a custom or user-supplied measure calculation at the intersections of row and column segment data retrieved from the database 301.

The custom measure calculation service 302 is to also filter the intersection date of the row and column segment data by a particular combination of conditions, supplied or identified by the user. The conditions were derived from the row and column segment definitions and are associated with the acquired row and column segment data retrieved from the database 301. The conditions are also compatible with the user-supplied measure.

Example measure calculations and filtering techniques are further presented below with reference to the FIG. 4.

Processing associated with the custom measure calculation service 302 was described in detail above with reference to the methods 100 and 200 of the FIGS. 1 and 2. Additionally, a sample implementation of the processing associated with the custom measure calculation service 302 is presented below after the discussion of the FIG. 4.

In some embodiments, the database segment measure calculation system 300 also includes a GUI tool 303. The GUI tool 303 resides within a machine-accessible medium and processes on a machine. The GUI tool 303 is to receive row and column segment definitions from a user. The row and column segment definitions include the conditions or the conditions can be derived from the row and column segment definitions. Moreover, the row and column segment definitions permit the proper acquisition of the row and column segment data from the database 301.

According to an embodiment, the GUI tool 303 is also used for a variety of other purposes, such as, but not limited to, presenting to the user available combinations of the conditions from which the user selects a particular desired combination to use as the filter that the custom measure calculation service 302 applies with the user-supplied measure calculation.

It may also be the case that the custom measure calculation service 302 presents the filtered results, which are associated with applying the user-selected combination of conditions, within a graphical grid. The GUI tool 303 may be used to receive a grid definition from the user, and the custom measure calculation service 302 uses that grid definition to present the filtered. The GUI tool 303 may also permit the user to supply a desired sort order for the filtered results that are to be presented in the grid and the custom measure calculation service 302 orders the filtered results in the grid in accordance with the user-desired sort order.

It is now understood how a user may interactively communicate and define how two cross database segments are to be analyzed. This configuration information is captured and communicated to a custom measure calculation service 302 that: acquires the cross database segments as row segment data and column segment data, applies a user-supplied measure calculation at the intersections of the row and column segment data and filters using a user-supplied combination of conditions to produce filtered results. The filtered results may even be displayed in a user defined grid format and ordered according to user direction.

FIG. 4 is an example screen shot depicting results associated with various measure calculations applied against sample database segments, according to an example embodiment.

FIG. 4 presents a variety of information. A top leftmost table depicts some example customer transactional data that may reside in an enterprise's database. There are three customers, Henry, Rob, and Scott. The larger table at the bottom depicts a results grid that may be populated after various custom combinations of criteria or filters are applied to a measure calculation.

In the example, the measure calculation initially is used to just total purchase amounts occurring at an intersection of a row and column segment. Also, the row segments appear as: "Bought shoes," "Bought shirts," "Bought CDs," "Bought DVDs," "Bought watches," and "Bought books." The column segments appear as: "Shopped in Store," "Shopped Online," and "Shopped in Catalog."

Each intersection of a particular row and column segment includes results associated with applying or not applying filters to the total purchase amount measure calculation. For example, the intersecting cell for the "Bought shoes" row and the "Shopped in Store" column for the first cell labeled "Henry" depict 5 different dollar values. The conditions or lack thereof used to filter the measure calculation against the total purchase amount are labeled 1-5. The "Results Legend" in the top right table depicts the combination of conditions or criteria, if any that was used to arrive at the values listed.

So, in the top leftmost cell labeled "Henry" there appears 5 different dollar amounts. The first one is listed at $14; this is arrived at by applying no filter to the measure calculation of total purchase amount. So, all of Henry's purchases in the "Customer Transaction Data" totals $14. This approach with no filter on the measure calculation is how conventional database solutions would approach the matter. However, the teachings presented herein permit the user to actually see 4 other possibilities where the intersection of the row and column segment data are further filtered based on user-selected row and column segment conditions or criteria.

Consequently, when a user picks condition 2 (from the "Results Legend"), this indicates that both the row and the column condition are to be used to filter the results. Here, it can be seen that when this is done only one entry in the "Customer Transaction Data" is applicable, namely $5 (shoes in store). If condition 3 is selected, then filtering occurs on the row or column conditions. This results in $7 (shoes in store and shirt in store). Condition 4 filters on just the row condition, which is $5 (shoes in store). Finally, condition 5 filters on just the column condition, which is again $7 (shoes in store and shirt in store).

Each row and column and intersecting cell is presented as further illustration in the FIG. 4. The condition 1 is depicted to demonstrate how previous techniques addressed the problem. Conditions 2-5 illustrate fine-grain selectable combinations of row and column segment conditions that can be achieved with the teachings presented herein.

It has now been demonstrated how granular measure calculations may be custom applied to database segments developed by a user. The pseudo code that follows provides one example implementation for achieving this. It is noted that other implementations may be used as well and that the following pseudo code is provided for purposes of comprehension and illustration only.

*cross segment analysis (filter by row segments / filter by column segments)*

*create "temp tables" for the "segments"*

*1) create universe temp table*
*take segment for universe,*
*direct it to WK_CROSS_SEGMENT_ANALYSIS, Segment_Type = 3.*
*1 SQL; 1 sub-select; 1 scan of universe source table.*
*query form for this is the same as before.*

*2) create row segment and column segment temp tables*
*take segments for row/column inner join universe,*
*direct them to WK_CROSS_SEGMENT_ANALYSIS, Segment_Type = 1/2.*
*source the universe from WK_CROSS_SEGMENT_ANALYSIS,*
*Segment_Type = 3.*
*r + c SQLs; 2 sub-selects each, 1 sourced from segment temp table;*
*1 scan of segment source table each and 1 scan of segment temp table each.*
*r + c scans of segment source tables total and r + c scans of segment temp table total.*
*query form for this is the same as before.*

*3) create row union segment and column union segment temp tables*
*source from WK_CROSS_SEGMENT_ANALYSIS, Segment_Type 1/2, to get*
*row/column union segment (no need to join universe),*

*direct them to WK_CROSS_SEGMENT_ANALYSIS, Segment_Type = 4/5.*

*2 SQLs; r + c sub-selects total, all sourced from segment temp table, all connected by UNION;*

*r + c scans of segment temp table total.*

*query form for this is the same as before.*

*create "temp tables" for the "measures"*

*4) create temp tables for universe join measure (1 per measure)*

*source the universe from WK_CROSS_SEGMENT_ANALYSIS,*

*Segment_Type = 3.*

*measure has no aggregate, condition for universe does not apply to any measure.*

*m SQLs; 2 sub-selects each, 1 sourced from segment temp table;*

*1 scan of segment temp table each and 1 scan of measure source table each.*

*m scans of segment temp table total and m scans of measure source tables total.*

*query form for this will look like the following:*

*select*

*<column>, ...*

*From*

*(*

*<sub-select>   // universe sourced from segment temp table*

*WK_CROSS_SEGMENT_ANALYSIS*

*)*

*Join*

*(<sub-select>*

*// measure with no aggregate and no segment condition*

*)*

*5)    Create temp tables for row segment join measure (1 per row segment per measure)*

*source the row segment from WK_CROSS_SEGMENT_ANALYSIS,*

*Segment_Type = 1.*

*source the measure from step 4) above.*

*measure has no aggregate, condition for row segment applied to each measure.*

*r * m SQLs; 2 sub-selects each, 2 sourced from different temp tables; 2 scans of different temp tables each.*

*r * m scans of segment temp table total and r * m scans of measure temp tables total.*

*query form for this will look like the following:* select

<column>, ...

From (

<sub-select> // row segment sourced from segment temp table

WK_CROSS_SEGMENT_ANALYSIS)

Join (

Select

<structure level>

<measure columns> from

<measure temp table>

Where

<row segment condition>)

6) create temp tables for row union segment join measure (1 per measure)source the row union segment from WK_CROSS_SEGMENT_ANALYSIS, Segment_Type = 4.

source the measure from step 4) above.

measure has no aggregate, condition for row union segment applied to each measure.

row union segment conditions connected by OR.

m SQLs; 2 sub-selects each, 2 sourced from different temp tables; 2 scans of different temp tables each.

m scans of segment temp table total and m scans of measure temp tables total.

query form for this will look like the following:

select

<column>, ...

From (

<sub-select> // row union segment sourced from segment temp table

WK_CROSS_SEGMENT_ANALYSIS)

Join (select

<structure level>

\<measure columns>

From

\<measure temp table>

Where

\<row segment 1 condition> or

\<row segment 2 condition> or

...

)

do 5) and 6) for column now do the calculations 7) calculate results for the universe this will be the universe left outer join all the measures.

source the universe from WK_CROSS_SEGMENT_ANALYSIS,

Segment_Type = 3.

source the measures from step 4) above.

do the first aggregate then join to the universe, then do the second aggregate1 SQL; m + 1 sub-selects; m + 1 scans of different temp tables.

query form for this will look like the following:

select

\<second aggregate>

From (

\<sub-select> // universe sourced from segment temp table

WK_CROSS_SEGMENT_ANALYSIS)

left outer join (

Select

\<structure level>

\<first aggregate>

From

\<measure 1 temp table>)

on

\<join to universe on structure level> left outer join ( select

<structure level>

<first aggregate>

From

<measure 2 temp table>

)

on

<join to universe on structure level> ...

8) calculate results for the row segments (non-intersection, non-total)

this will be the row segment left outer join all the measures.

source the row segment from WK_CROSS_SEGMENT_ANALYSIS,

Segment_Type = 1.

source the measures from step 5) above.

do the first aggregate then join to the row segment, then do the second aggregate.

r SQLs; m + 1 sub-selects each; m + 1 scans of different temp tables each.

r scans of segment temp table total and r * m scans of measure temp tables total.

query form for this will look like the following:

select

<second aggregate> from (

<sub-select> // row segment sourced from segment temp table

WK_CROSS_SEGMENT_ANALYSIS

)

left outer join (

Select

<structure level>

<first aggregate> from

<measure 1 temp table (includes condition from row segment)>

)

On

<join to row segment on structure level> left outer join (

*Select*

*<structure level>*

*<first aggregate>*

*from*

*<measure 2 temp table (includes condition from row segment)>*

*)*

*on*

*<join to row segment on structure level>*

*...*

9) *Calculate results for the row union segment (non-intersection, total for row segments)*

*this will be the row union segment left outer join all the measures. source the row union segment from WK_CROSS_SEGMENT_ANALYSIS,*

*Segment_Type = 4.*

*source the measures from step 6) above.*

*do the first aggregate then join to the row union segment, then do the second aggregate.*

*1 SQL; m + 1 sub-selects; m + 1 scans of different temp tables.*

*query form for this will look like the following:*

*select*

*<second aggregate>*

*From*

*(*

*<sub-select>  // row union segment sourced from segment temp table WK_CROSS_SEGMENT_ANALYSIS*

*)*

*left outer join*

*(*

*select*

*<structure level>*

*<first aggregate>*

*from*

*<measure 1 temp table (includes conditions connected by OR, from all row segments)>)*

*on*

*<join to row union segment on structure level>*

*left outer join*

*(*

*Select*

*<structure level>*

*<first aggregate>*

*from*

*<measure 2 temp table (includes conditions connected by OR, from all row segments)>*

*)*

*on*

*<join to row union segment on structure level> ...*

*do 8) and 9) for column*

10) calculate results for the intersections (non-total), one row (the greater axis) at a time this will be (row segment inner join column split union) left outer join all the measures with each column segment condition separately (you'll have c * m measure sub-selects).

source the row segment from WK_CROSS_SEGMENT_ANALYSIS,

Segment_Type = 1.

source the column split union from WK_CROSS_SEGMENT_ANALYSIS,

Segment_Type = 2.

source the measures from step 5) above and add the segment conditions from the column segments separately.

do the first aggregate then join to the segment sub-select, then do the second aggregate.

r SQLs; c * m + 2 sub-selects each, all sourced from temp tables;

2 scans of segment temp table each and c * m scans of measure temp tables each.

2r scans of segment temp table total and r * c * m scans of measure temp tables total.

query form for this will look like the following:

select

*<segment id>*

*<second aggregate>*

*from*

*(*

*select*

*<segment id>*

*<structure level>*

*From*

*<sub-select>* // row segment sourced from segment temp table

WK_CROSS_SEGMENT_ANALYSIS

*join*

*<sub-select>* // all the column segments separately from segment temp table
WK_CROSS_SEGMENT_ANALYSIS on

*<structure level>*

*) segment*

*left outer join*

*(*

Select

*<segment id>* // id for column segment 1

*<structure level>*

*<first aggregate>* from

*<measure 1 temp table (includes condition from row segment)>* where

*<column segment 1 condition>*

*)* on

*<join to segment sub-select above on segment id and structure level>* left outer join (select *<segment id>* // id for column segment 1

*<structure level>*

*<first aggregate>* from

*<measure 2 temp table (includes condition from row segment)>*

Where

*<column segment 1 condition>*

*)* on

*<join to segment sub-select above on segment id and structure level>*

...

*left outer join*

*(* select

*<segment id>* // id for column segment 2

*<structure level>*

*<first aggregate>* from

*<measure 1 temp table (includes condition from row segment)>*

*where*

*<column segment 2 condition>*

*)*

*on*

*<join to segment sub-select above on segment id and structure level>*

*left outer join*

*(*

*select*

*<segment id>   // id for column segment 2*

*<structure level>*

*<first aggregate>*

*from*

*<measure 2 temp table (includes condition from row segment)>*

*where*

*<column segment 2 condition>*

*)*

*on*

*<join to segment sub-select above on segment id and structure level>*

*...*

*11) calculate results for the row totals (far right column) this will be (row segment inner join column union segment) left outer join all the measures with all the column segment conditions connected by OR.*

*source the row segment from WK_CROSS_SEGMENT_ANALYSIS,*

*Segment_Type = 1.*

*source the column union segment from WK_CROSS_SEGMENT_ANALYSIS,*

*Segment_Type = 5.*

*source the measures from step 5) above and add all the column segment conditions connected by OR.*

*do the first aggregate then join to the segment sub-select, then do the second aggregate.*

*r SQLs; m + 2 sub-selects each, all sourced from temp tables;*

*2 scans of segment temp table each and m scans of measure temp tables each.*

*2r scans of segment temp table total and r * m scans of measure temp tables total.*

*query form for this will look like the following:*

*Select*

*<second aggregate>*

*from*

```
(
select
<structure level>
from
<sub-select>  // row segment sourced from segment temp table
WK_CROSS_SEGMENT_ANALYSIS
join
<sub-select>  // column union segment sourced from segment temp table
WK_CROSS_SEGMENT_ANALYSIS
On
  <structure level>
) segment
left outer join
(
select
<structure level>
<first aggregate>
from
<measure 1 temp table (includes condition from row segment)>
where
<column segment 1 condition> or
<column segment 2 condition> or
...
)
on
<join to segment sub-select above on structure level>
left outer join
(
select
<structure level>
<first aggregate>
from
<measure 2 temp table (includes condition from row segment)>
where
<column segment 1 condition> or
<column segment 2 condition> or
...
```

)

on

<join to segment sub-select above on structure level>

...

do 11) for column 12) calculate results for the overall totals (bottom right cell) this will be (row union segment UNION column union segment) left outer join all the measures. source the row union segment from WK_CROSS_SEGMENT_ANALYSIS, Segment_Type = 4.

source the column union segment from WK_CROSS_SEGMENT_ANALYSIS,

Segment_Type = 5.

source the measures from 4) above and add all the row and column segment conditions connected by OR.

do the first aggregate then join to the segment sub-select, then do the second aggregate.

1 SQL; m + 2 sub-selects; m + 2 scans of different temp tables.

query form for this will look like the following:

select

<second aggregate> from ( select

<structure level> from

<sub-select> // row union segment sourced from segment temp table

WK_CROSS_SEGMENT_ANALYSIS UNION

<sub-select> // column union segment sourced from segment temp table

WK_CROSS_SEGMENT_ANALYSIS on

<structure level>

) segment left outer join ( select

<structure level>

<first aggregate>

From

```
<measure 1 temp table (no segment condition)>
where
<row segment 1 condition> or
<row segment 2 condition> or
...
OR
<column segment 1 condition> or
<column segment 2 condition> or
...
)
on
<join to segment sub-select above on structure level>
left outer join
(
select
<structure level>
<first aggregate>
from
<measure 2 temp table (no segment condition)>
where
<row segment 1 condition> or
<row segment 2 condition> or
...
OR
<column segment 1 condition> or
<column segment 2 condition> or
...
)
on
<join to segment sub-select above on structure level>
...
```

© NCR Corp., Dayton, Ohio 2006

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method to execute on a machine, comprising:
   receiving, by the machine and from a user via a GUI tool, one or more row segment definitions and one or more column segment definitions, wherein each segment definition comprises one or more criteria, and wherein each segment definition defines a segment;
   receiving, by the machine and from the user via the GUI tool, a measure calculation;
   populating, by the machine, selectable combinations of row and column segment conditions within fields of the GUI tool;
   receiving, by the machine and from the user via the GUI tool, a selection of a combination from the selectable combinations; and
   applying, by the machine, the user-supplied measure calculation to filtered intersections of the one or more row segments and the one or more column segments, where each intersection comprises data relating to one or more entities contained in both a respective row segment and a respective column segment, and where the filtering is based on the user-selected combination.

2. The method of claim 1 further comprising, receiving, by the machine and from the user via the GUI tool, a grid layout definition associated with a graphical grid, wherein the graphical grid is used to present the results of applied calculation.

3. The method of claim 2 further comprising, acquiring, by the machine, data relating to each intersection by querying a database using the respective row segment and column segment definitions.

4. The method of claim 3 further comprising, sorting, by the machine, the results within the graphical grid in response to a sort order supplied by the user via the GUI tool.

5. The method of claim 4 further comprising, resorting, by the machine, the results to a different sort order in response to a dynamic instruction received from the user interacting with the graphical grid.

6. The method of claim 1, wherein receiving the user-supplied measure further includes presenting the user via the GUI a list or a library of available measure calculations for user selection.

7. The method of claim 1, wherein populating further includes generating the combinations as: one or more row segment conditions; one or more column segment conditions; one or more row segment conditions and one or more column segment conditions; one or more row segment conditions or one or more column segment conditions; and no row segment conditions or column segment conditions.

* * * * *